United States Patent [19]
Mitchell

[11] 3,769,692
[45] Nov. 6, 1973

[54] SPACER ASSEMBLY

[75] Inventor: Wallace F. Mitchell, Arlington Heights, Ill.

[73] Assignee: Ammco Tools, Inc., North Chicago, Ill.

[22] Filed: Nov. 9, 1971

[21] Appl. No.: 197,179

Related U.S. Application Data

[62] Division of Ser. No. 66,530, Aug. 24, 1970, Pat. No. 3,663,045.

[52] U.S. Cl. .................................. 29/559, 29/406
[51] Int. Cl. ............................................. B23q 7/00
[58] Field of Search ..................... 287/52.06, 52.07; 279/1 L, 1 J, 2 US, 16; 269/321 B, 189; 85/50 R, 62; 29/559, 156.4, 406

[56] References Cited
UNITED STATES PATENTS

| 2,334,606 | 11/1943 | Castiglia | 279/2 UX |
| 1,345,358 | 7/1920 | Fuller | 85/50 R UX |
| 3,039,645 | 6/1962 | Castiglia | 85/50 R X |
| 2,426,219 | 8/1947 | Jackson | 287/53 |

FOREIGN PATENTS OR APPLICATIONS

| 864,340 | 1/1953 | Germany | 85/50 R |

Primary Examiner—Richard J. Herbst
Assistant Examiner—James R. Duzan
Attorney—Fidler, Patnaude & Batz

[57] ABSTRACT

A method of mounting a brake disc on a lathe for resurfacing the faces thereof employs a self-centering spacer used in conjunction with a pair of adapter cones to prevent bending of the arbor when the cones are tightened against the disc.

2 Claims, 3 Drawing Figures

PATENTED NOV 6 1973
3,769,692
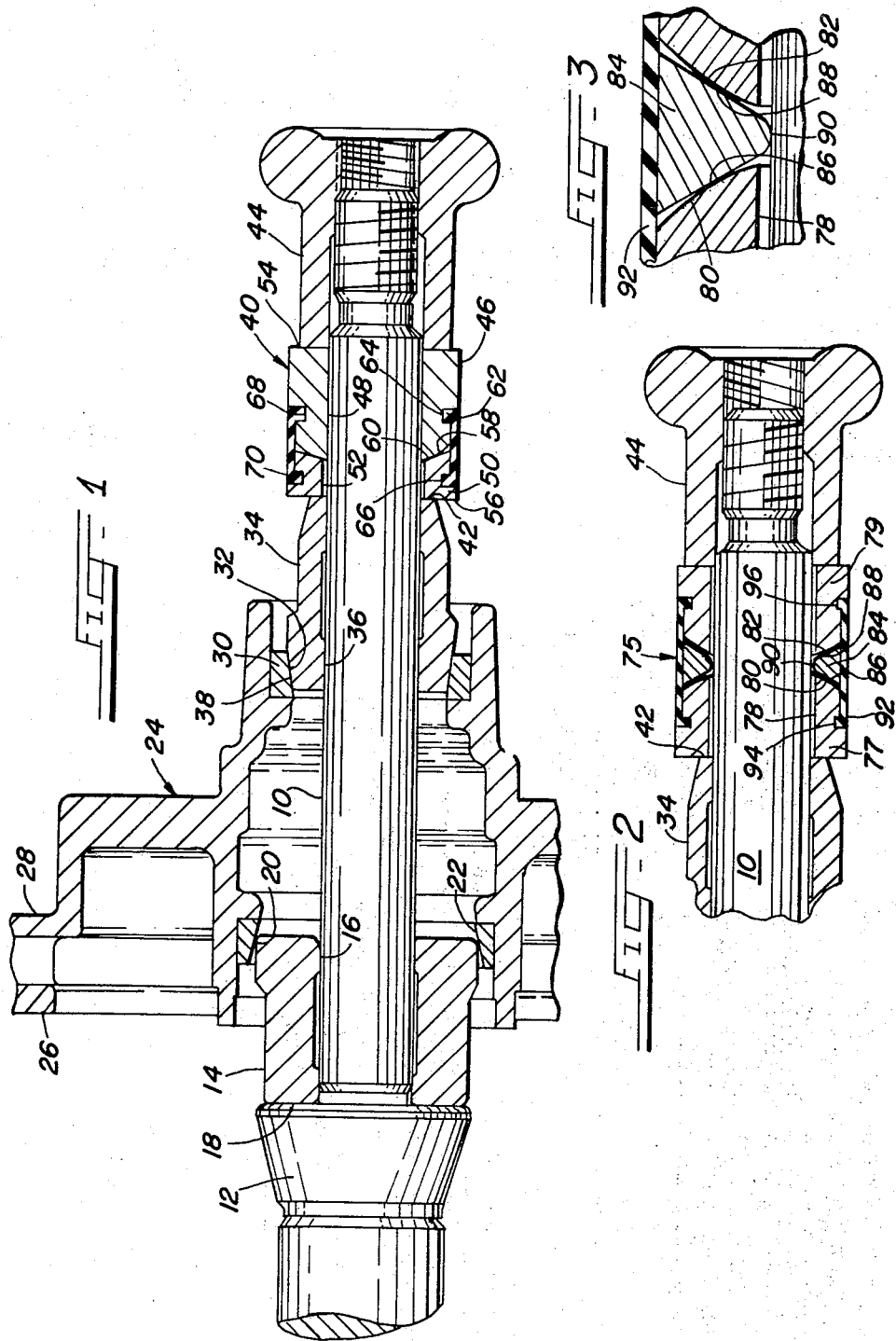

SPACER ASSEMBLY

This is a Division of copending application Ser. No. 66,530, filed Aug. 24, 1970 by Wallace F. Mitchell now U.S. Pat. No. 3663045.

The present invention generally relates to a spacer assembly for mounting on a rod or shaft, and it relates more particularly to such an assembly for spacing two members mounted on a rod or shaft and whose opposing faces are not precisely co-planar.

In order to machine planar faces on rotors such as brake discs, it is the usual practice to mount such rotors on the arbor of a lathe between a pair of adapters designed to mate with the hub portion of the particular rotor. In the resurfacing of brake discs, these adapters are generally designed to mate with the conical surfaces of the outer bearing races which are fixedly mounted within the hub of the brake disc. The adapters fit snugly on the arbor of the lathe and when tightened against the races of the wheel disc, provide a driving connection between the arbor and the disc and, in addition, align the disc with the axis of the arbor. Unless the adapters are precisely aligned with the arbor and the outer end faces of the adapters are perpendicular to the axis of the arbor, when the nut on the end of the arbor is tightened to clamp the brake disc between the adapters, two undesirable conditions occur. One, there is distortion in the nature of bending of the arbor, and, two, there is uneven pressure between the adapters and the brake disc or between the adapter and the nut. The former condition results in wobble and run-out during machining of the face of the disc, and the latter results in slippage of the disc relative to the arbor.

An object of this invention is, therefore, to provide new and improved means for mounting a rotor such as a brake disc on the arbor of the lathe.

Another object of the present invention is to provide means for assuring proper alignment of the wheel disc and the arbor of the lathe.

A further object of the present invention is to provide a new and improved self-aligning spacer assembly.

Briefly, the above and further objects may be realized in accordance with the present invention by providing a pair of adapters for clamping a brake disc or other rotor therebetween on the arbor of a lathe. One of these adapters engages the brake disc along a circular line while the other has a conical surface complementary to a precisely located conical surface within the hub of the disc. A self-aligning spacer is positioned between the latter adapter and the end nut on the arbor so that as the nut is tightened up the wheel disc is rigidly clamped between the adapters in alignment with the axis of the arbor. If the end face of the latter adapter is not precisely perpendicular to the axis of the arbor, due to the self-aligning nature of the spacer, 360° contact with the adjacent face of the adapter is nevertheless assured thereby preventing distortion of the arbor when the nut is tightened and also insuring good frictional contact between the adjacent adapter and the brake disc.

In one embodiment of the invention the spacer assembly includes a pair of sleeves, one of which tightly fits onto the arbor and the other of which has a internal diameter providing a clearance of about 0.050 inch or more with the arbor. The sleeves are held together by a resilient boot and have mutually abutting faces, one of which is spherical and the other of which is conical. For some applications the faces may be complementary spheres. The opposite end faces of the adapters are perpendicular to the axis of the bores therethrough.

Further objects and advantages and a better understanding of the present invention may be had by reference to the following detailed description taken in connection with the accompanying drawing wherein:

FIG. 1 is a fragmentary sectional view of a brake disc mounted on the arbor of a lathe by mounting apparatus embodying the present invention; and FIGS. 2 and 3 are sectional views of a portion of the mounting apparatus of FIG. 1 but including a different spacer assembly embodying the present invention.

Referring now to the drawings and particularly to FIG. 1 thereof, there is shown an arbor 10 connected to the spindle 12 of a lathe. An adapter 14 in the form of a sleeve has an internal diameter closely approximating the diameter of the arbor 10 so as to fit snugly thereon. The outer end face 18 of the adapter 14 is planar and perpendicular to the bore thereof so as to fit against the end face of the spindle 12. The wheel disc engaging surface 20 is annular and beveled so as to provide substantially line contact with a generally conical surface 22 of the wheel disc 24. The surface 22 may be the outer race of the inner wheel bearing which supports the disc 24 on the axle of the automobile with which it is used. Consequently, the surface 22 is precisely located relative to the braking surfaces 26 and 28 of the wheel disc. The wheel disc 24 also has an outer wheel bearing which includes an outer bearing race 30 having a conical surface 32. As is well known by those skilled in the art, the conical surfaces 22 and 32 have the same axis and it lies perpendicular to the planes of the brake surfaces 26 and 28.

A second wheel adapter 34, also sleevelike in construction, has a bore 36 whose internal diameter approximates the diameter of the arbor 10 so as to fit snugly thereon. The adapter 34 has a conical surface 38 at one end which is complementary to the conical surface 32 thereby providing a large annular area of contact between the adapter 34 and the brake disc 24 when the disc is compressed between the adpters 14 and 34. It will be noted that the adapters 14 and 34 have similar brake disc engaging surfaces at the opposite ends thereof for accommodating brake discs of a different size.

A spacer assembly 40 engages the end surface or face 42 of the adapter 34 and a nut 44 is threaded onto the end of the arbor 10. It may be seen that when the nut 44 is tightened onto the arbor 10 a force is exerted through the spacer assembly 40 to compress the brake disc 24 between the adapters 14 and 34. While the wheel disc 24 may rock to some extent on the beveled surface 20 of the adapter 14 because of the line contact provided, no such movement is permitted between the engaging surfaces 32 and 38 on the race 30 and the adapter 34. Therefore, any misalignment of the surface 32 relative to the principal axis of the wheel disc 34 or any misalignment of the end surface 42 of the adapter 34 relative to the principal axis of the arbor 10 tends to result in an improper alignment of the braking surfaces 26 and 28 relative to the axis of the arbor 10. More particularly, if the nut 44 were to directly engage the face 42 of the adapter 34 and anything less than 360° contact were to be provided between the nut 44 and the adapter 34 or between the adapter 34 and the brake disc 24, as the nut 44 were tightened, the arbor 10 would be deflected. Even relatively small deflections of the arbor are intolerable since they result in substantial wobble or run-out of the brake disc near the edges. These discs may have a radius of about 10 inches. Moreover, in order to effect maximum material removal from the surfaces 26 and 28 during machining and further to insure a smooth satisfactory braking surface it is important that no slippage be provided between the brake disc and the arbor 10. Should th contact between the adapter 34 and the wheel disc be substantially less than 360° or if the contact between the adapter 34 and the nut 44 be substantially less than 360° it has been found that slippage of the disc 24 on the arbor results.

In order to assure 360° contact between the adapter 34 and the wheel disc 24 the spacer assembly 40 includes a first sleeve 46 having a bore 48 approximating the size of the arbor 10 so as to fit snugly thereon and a sleeve 50 having a bore 52 exceeding the diameter of the arbor 10 by about 0.050 inch or more. The sleeve 46 has a planar end face 54 lying precisely perpendicular to the axis of the bore 48 therein and the sleeve 50 has an end face 56 which is planar and which is also perpendicular relative to the bore 52 therein. The sleeves 46 and 50 have abutting faces or seats 58 and 60 respectively. The face 58 is spherical and the face 60 is conical thereby to provide substantial line contact throughout a circle. A resilient boot or connector 62 maintains the sleeves 46 and 50 in assembled relationship. As shown, the boot 62 has a pair of end flanges 64 and 66 disposed within annular grooves 68 and 70 in the sleeves 46 and 50 respectively. During assembly, the boot 62 is stretched over the sleeves and released so that it occupies the position as illustrated in the drawing. The boot 62 not only functions to maintain the sleeves in assembled relationship but it also prevents foreign matter from collecting in the space between the seats 58 and 60 and retains a lubricant such as grease in such space. If desired, a recess may be provided beneath the inner surface of the boot for holding a lubricant which may be inserted therein by means of a syringe and needle.

In using the apparatus of the present invention as illustrated in FIG. 1 to mount the wheel disc 24 on the arbor 10, an adapter 14 having an outer diameter equal to the inner diameter of the race 22 is selected and placed on the arbor 10 adjacent the spindle 12. The wheel disc 24 is then positioned on the arbor and an adapter 34 is placed over the arbor and positioned with its conical surface 38 engaging the inner conical surface 32 of the outer bearing race of the disc 24. The spacer 40 is then placed on the arbor and the nut 44 is tightened to clamp the wheel disc 24 between the adapters 14 and 34 and thus onto the arbor 10. Any misalignment of the adapter 34 is corrected by the self-aligning spacer assembly 40 so that it is impossible to distort or deflect the arbor 10 by tightening the nut 44 thereon. Moreover, 360° contact between the nut 44 and the spacer 40, between the spacer 40 and the adapter 34, and between the adapter 34 and the wheel disc 24 is ensured whereby slippage of the disc 24 during machining is prevented.

With reference to FIG. 1, it should be noted that the sleeve 50 having the oversize bore 52 therein must be adjacent to the adapter 34 to correct for any misalignment of the adapter 34 on the arbor 10. Accordingly, if the spacer assembly were inadvertently clamped on the arbor with the sleeve 46 in engagement with the adapter 34 no self-alignment would be provided and the machined surfaces 26 and 28 might be unsatisfactory. In order to avoid this possibility, in accordance with another feature of the present invention there is provided a spacer assembly 75 as illustrated in FIG. 2.

The spacer assembly 75 includes a first sleeve 77 having a bore 78 exceeding the diameter of the arbor 10 by about 0.050 inch or more and a second sleeve 79 identical to the sleeve 77. The sleeves 77 and 79 have spherical faces or seats 80 and 82 respectively which engage conical faces or seats 86 and 88 on a sleeve 84. The bore 90 of the sleeve 84 approximates the diameter of the arbor 10 so as to fit snugly thereon. Resilient means in the form of a rubber boot 92 maintains the sleeves 77, 84 and 79 in assembled relationship. More particularly, the boot 92 includes a pair of re-entrance annular flanges 94 and 96 at respective ends thereof which are received in annular grooves in the sleeves 77 and 79. The spacer 75 may thus be placed onto the arbor 10 with either end in engagement with the face 42 of the adapter 34 thereby eliminating any chance of error occasioned by improper positioning of the spacer assembly between the adapter 34 and the end nut 44.

While the present invention has been described in connection with particular embodiments thereof, it will be understood by those skilled in the art that many changes and modifications may be made without departing from the true spirit and scope of the present invention. Therefore, it is intended by the appended claims to cover all such changes and modifications which come within the true spirit and scope of this invention.

What is claimed is:

1. A method of mounting a rotor to a shaft, comprising the steps of
    fixedly placing on said shaft a first sleevelike member having an external annular surface,
    placing said rotor on said shaft with an internal diameter surface of said rotor engaging said annular surface along a substantially annular area,
    placing on said shaft a second sleevelike member with an external annular surface thereon engaging another internal diameter surface on said rotor along a substantially annular area thereby preventing said rotor from rocking on said shaft,
    placing on said shaft a self-centering spacer having a planar end surface lying perpendicular to the axis of said shaft, and
    tightening a nut on said shaft against said planar end surface to clamp said rotor between said sleevelike members,
    whereby the clamping force on said shaft is axial and does not tend to bind said shaft.

2. A method according to claim 1 wherein
said rotor is a brake disc and
said shaft is the arbor of a lathe.

* * * * *